April 7, 1959     J. L. MELCHOR     2,881,395

MODULATION APPARATUS

Filed Jan. 7, 1957

INVENTOR.
JACK L. MELCHOR
BY
ATTORNEY

United States Patent Office 2,881,395
Patented Apr. 7, 1959

2,881,395

MODULATION APPARATUS

Jack L. Melchor, Los Altos, Calif., assignor to Sylvania Electric Products, Inc., a corporation of Massachusetts Application January 7, 1957, Serial No. 632,714

8 Claims. (Cl. 332—51)

This invention relates to high frequency apparatus, and is more particularly concerned with apparatus for modulating a high frequency electromagnetic wave signal.

Modulation may be defined as a process by which an electromagnetic carrier signal is varied in response to some outside influence. Several methods of modulation have heretofore been employed, among those possible being the alteration of amplitude, polarization, frequency, propagation direction, phase, or combinations of these. Of the methods currently employed, amplitude, frequency and phase modulation are the most common and more recently polarization modulation has come into considerable use. One method of polarization modulating a plane polarized signal is to mechanically rotate a half-wave plate in the transmission path. An equivalent of mechanical half-wave plate rotation may be produced by generating a half-wave plate using a ferrite in a transverse magnetic field. By rotating the magnetic field electrically, by proper phasing between two orthoginal A.C. field components, the analog of the mechanical rotation of the plate results. Faraday observed that the polarization plane of a light beam was rotated while passing through matter in the presence of a longitudinal magnetic field. This phenomenom has come to be known as the Faraday effect and has also been observed at microwave frequencies if a ferrite or an ionized gas is placed in a wave guide transmission system in the direction of an applied magnetic field. By controlling the intensity of the magnetic field, or altering the degree of ionization of the gas if such is used, the polarization angle can be varied at will.

The present invention is concerned with amplitude modulation of a microwave signal, and more particularly concerns the amplitude modulation of two counter-rotating components of a linearly polarized wave, and in the respect that a ferrite, an ionizable gas, or other gyromagnetic material, is employed to achieve the modulation, resembles the polarization modulation obtained by the Faraday effect. Gyromagnetic media, that is, those materials exhibiting the phenomena of gyromagnetic resonance, include ionized gases and magnetic semi-conductors, for example, ferrites, and either may be used in the realization of the advantages of the invention in that their effects on microwave signals are similar. For instance, when an ionized gas is placed in a magnetic field, free electrons in the gas having a velocity component perpendicular to an applied magnetic field are caused to rotate in circles in a plane normal to the field in a direction depending upon the polarity or direction of the magnetic field, and at a frequency depending on the intensity of the magnetic field. When an incident circularly polarized electromagnetic wave rotating in the same direction as the direction of rotation of the electrons passes through the gas, and if the frequency of rotation of the electrons is near the frequency of the incoming wave, energy is transferred from the electric component of the electromagnetic wave to the rotating electrons. The frequency at which this occurs is called the "gyromagnetic resonant frequency," at which frequency a large amount of energy is absorbed, or stated another way, there is a substantial attenuation of the wave in the gyromagnetic media. However, when the applied magnetic field is of an intensity slightly removed from that necessary to achieve gyromagnetic resonance, the attenuation is insignificant, a feature also employed in the present invention, as will be seen hereinafter.

Magnetic semi-conductors as used herein include ferrites and other magnetic media in which electrons in the outer orbits of constituent atoms have magnetic moments which cause them to precess under the influence of an applied magnetic field. When such materials are placed in a magnetic field, the electrons in the outer orbit of the constituent atoms precess to align their axes of precession along the direction of the applied magnetic field. The electrons in the outer orbits rotate in a plane perpendicular to the lines of flux of the magnetic field and when incident electromagnetic waves having a frequency equal to the precession frequency of the semi-conductors (dependent on the intensity of the magnetic field) enter the region of the magnetic semi-conductors, energy is transferred from the magnetic component of the wave to the precessing electrons. As in the case of ionized gas, the incident signal is attenuated to a substantial degree at the gyromagnetic resonant frequency, and by an insignificant amount when the frequency of precession is slightly off this frequency.

Another property of gyromagnetic media utilized in the invention is that two counter-rotating circularly polarized waves are affected differently by the media. Depending upon the direction of application of the magnetic field to the media, the component rotating in one direction may be attenuated as much as 100 db while the other component is transmitted substantially unattenuated. Thus, in accordance with the invention, two oppositely polarized gyromagnetic elements are serially positioned in a wave transmission system, for example, a wave guide, whereby the first element upon which the wave is incident attenuates one of the circularly polarized components but has little effect upon the other, and the second attenuates the component which was transmitted past the first. With each of the media oppositely magnetically polarized with separate magnetic fields of intensities near that to cause gyromagnetic resonance, low amplitude variations of the magnetic field applied to the media, just sufficient to cause gyromagnetic resonance, provide independent amplitude modulation of the two components. Thus, if a linearly polarized wave, which may be considered as consisting of two counter-rotating circularly polarized waves of equal amplitude having angular velocities equal to the frequency of the linearly polarized wave, is applied to the device, the resulting signal consists of a pair of counter-rotating amplitude-modulated circularly polarized signals. Accordingly, it is an object of the present invention to provide apparatus for amplitude modulating a microwave signal.

Another object of the invention is to provide apparatus for separately modulating the two counter-rotating components of a linearly polarized electromagnetic wave.

Another object of the invention is to provide apparatus utilizing the phenomena of gyromagnetic resonance absorption for amplitude modulating an electromagnetic wave.

Other objects, features and advantages of the invention will become apparent, and a better understanding of its construction and operation will be had from the following detailed description taken in connection with accompanying drawings in which.

Figure 1:
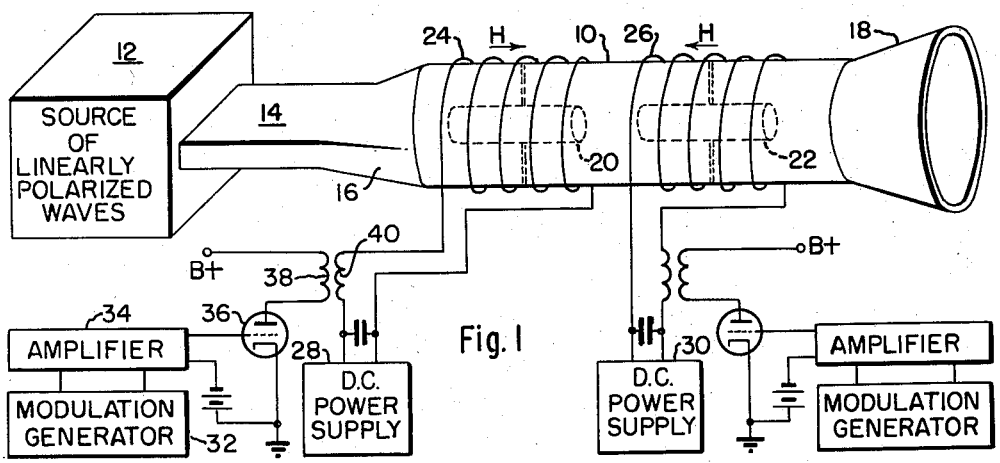
Fig. 1 is a diagrammatic sketch of the invention with modulating circuitry illustrated in schematic form.

Referring now to the drawings, and more particularly to Fig. 1, the modulating system of the invention consists essentially of wave guide means adapted to support circularly polarized waves, such as hollow circular wave guide 10, to which linearly polarized wave energy from a source 12, such as a magnetron or other suitable microwave oscillator, is coupled via rectangular wave guide 14 and rectangular-to-circular transition 16. The output end of the modulator may be coupled to any suitable utilization device, for example, an electromagnetic horn 18, capable of transmitting circularly polarized electromagnetic waves. Positioned within wave guide 10, preferably on the longitudinal axis thereof, and spaced from each other along the axis, are a pair of elements 20 and 22 embodying a suitable gyromagnetic media. These elements are illustrated as being of cylindrical shape and may consist of magnetic semi-conductor material, for example, ferrite rods, or the illustrated cylinders may be considered as representing cylindrical vessels formed of dielectric material and containing an ionizable gas. Separate magnetic fields are produced through elements 20 and 22 by coils 24 and 26, respectively, energized from direct current sources 28 and 30. The direction of current flow in coils 24 and 26 is such that the magnetic polarity of element 20 is opposite to that of element 22, as indicated by the oppositely directed arrows marked "H" appearing above the elements. The intensity of the magnetic fields produced by coils 24 and 26 and their respective energizing sources is near that required to cause gyromagnetic resonance absorption in the elements 20 and 22 at the frequency of source 12. That is, if ionizable gas is utilized as the gyromagnetic media in elements 20 and 22, the unidirectional fields are of such intensity that the frequency of rotation of the free electrons in the gas is almost equal to the frequency of the waves from source 12; or, if elements 20 and 22 embody a magnetic semiconductor, the fields are of such intensity that the precession frequency of the electrons in the outer orbits of constituent atoms is almost equal to the frequency of the oscillations from source 12.

Figure 3:
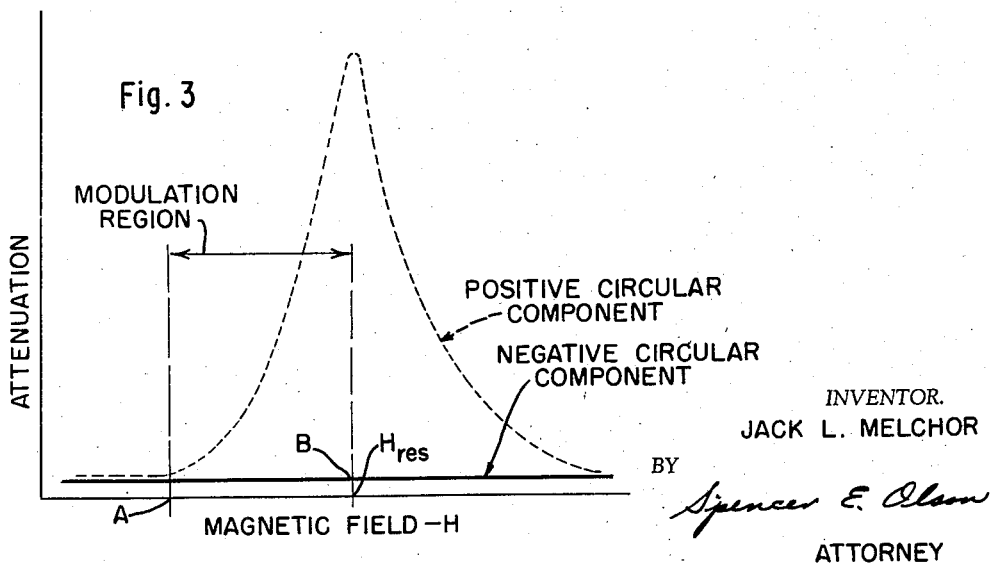
Fig. 3 is a curve illustrating the effects of gyromagnetic media on counter-rotating circular components of a linearly polarized wave.

In operation, linearly polarized electromagnetic wave energy from source 12 is propagated through rectangular wave guide 14 and transition 16 toward the left in circular wave guide 10. The linearly polarized wave energy entering guide 10 may be considered as consisting of two counter-rotating circularly polarized waves of equal amplitude, the angular velocity of the two components being equal to the frequency of source 12. Wave guide 10 supports the propagation of these circularly polarized components, and with the presence of the magnetic fields having the intensities described above, that is, just less than that necessary to cause gyromagnetic resonance absorption, both circular components are propagated through the guide essentially unattenuated and emerge from horn 18. If, however, the intensity of the magnetic fields pervading elements 20 and 22 is increased to the point that the frequency of rotation of free electrons (in gas), or the precession frequency (in ferrites), is equal to the frequency of rotation of the circularly polarized components, energy is transferred from one or the other of the circular components of one or the other of the gyromagnetic media 20 or 22. The direction of rotation of the free electrons in the gas, and the direction of precession in ferrites, depends upon the polarity of the pervading magnetic field, and at gyromagnetic resonance, energy is given up only by that circularly polarized component which is rotating in the same direction as such electrons are rotating. For example, for the indicated magnetic polarity for element 20, the clockwise or positive circular component may be attenuated, with the counter-clockwise or negative component freely transmitted, whereas the opposite magnetic polarity shown for element 22 may cause the counter-clockwise or negative component to be attenuated and the clockwise or positive circular component to be freely transmitted. The above-described situation for element 22 is depicted in Fig. 3, where at a field strength $H_{res}$, i.e., the field intensity where gyromagnetic resonance absorption occurs, the clockwise or positive circular component is strongly attenuated, as much as 100 db, whereas the negative circular component is only slightly attenuated. Thus, the oppositely polarized elements 20 and 22 have opposite effects on the two counter-rotating components, one being effective to attenuate, at gyromagnetic resonance, only the clockwise component, and the second being effective to absorb only the counter-clockwise component.

By reason of this phenomena, the two counter-rotating components of an incident linearly polarized wave may be independently amplitude modulated. Referring again to Fig. 3, and considering their characteristics as applied to element 20, with a magnetic field intensity just below that needed to cause resonance absorption, the operation may be at a point just to the left of the absorption curve, say at point A. At this field intensity neither component is appreciably attenuated, but if now the intensity of the magnetic field is slightly increased so that operation occurs in that region of the curve between points A and B, designated the modulation region, element 20 strongly attenuates the positive circular component of the incident wave, but as was noted earlier, the negative circular component is not attenuated. Therefore, it is seen that if the intensity of the magnetic field is varied between the points A and B of the curve of Fig. 3 in accordance with a modulating signal, the positive circular component will be amplitude modulated, with no modulation of the negative circular component occurring by reason of element 20. However, when the wave reaches element 22 the opposite action occurs; i.e., the negative circular component is amplitude modulated but the element has no effect on the already modulated positive circular component.

A suitable circuit for altering the intensity of the magnetic field over the modulation region of the curve of Fig. 3 is shown in Fig. 1, and may consist of a modulation generator 32, such as a microphone, a noise generator, or the like, coupled through amplifier 34 to the grid of modulator tube 36. The primary 38 of a transformer is connected in the plate circuit of tube 36, the secondary 40 of the transformer being connected in series with coil 24. The arrangement just described is operative to modulate the current in coil 40 in accordance with the output of the modulation generator 32, thereby to amplitude-modulate the clockwise circular component of circularly polarized wave energy propagated in wave guide 10. As was noted earlier, the intensity of the field provided by source 28 is just slightly less than is necessary to cause gyromagnetic resonance absorption, and accordingly, the incremental field to be furnished by the modulation circuit is relatively small. The steepness of the absorption curve in the modulation region permits a large amount of amplitude modulation with a very small change in magnetic field intensity. In this connection, it is emphasized that the modulating magnetic field is insufficient to produce any significant polarization modulation of the incident wave, and accordingly, the operation is not to be confused with that caused by the Faraday effect.

A second circuit, identical with the one just described, is provided to modulate the magnetic field through element 22, it being understood that the magnetic polarity is opposite to that of element 20 whereby the counter-clockwise or negative circular component is attenuated, and consequently amplitude-modulated, the clockwise component being transmitted substantially unattenuated. Thus, the counter-clockwise component may be modulated at a different frequency or in a different manner than the clockwise component, providing, in effect, two distinct signal channels. One channel, for example, may be used for transmitting intelligence and the other may be noise-modulated, or one channel may be used to transmit a time signal to aid in extracting intelligence from the other channel.

Figure 2:
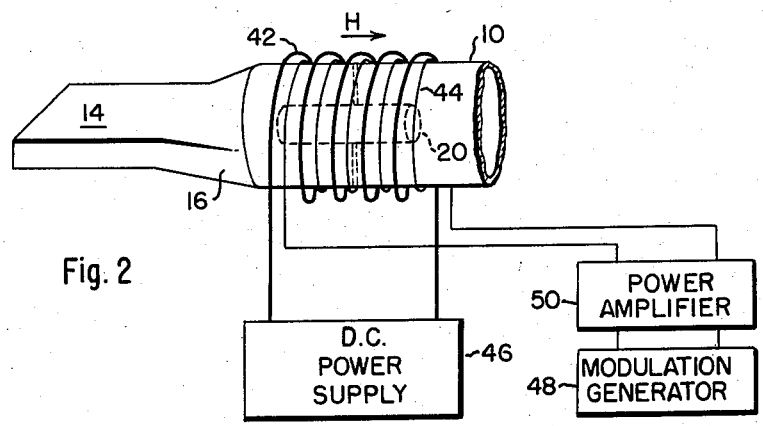
Fig. 2 is a fragmentary diagram of the invention illustrating in schematic form an alternate form of modulating circuitry for the system of Fig. 1.

Fig. 2 illustrates an alternate arrangement for modulating the magnetic field applied to the gyromagnetic elements 20 and 22. Only the left hand element 20 of Fig. 1 is shown, it being understood however, that a similar circuit is necessary for element 22. Instead of a single coil for each element as shown in Fig. 1, two current-carrying coils, 42 and 44, surround wave guide 10 in the region of element 20, coil 42 being energized from a source of unidirectional voltage 46 to produce in element 20 a unidirectional magnetic field having an intensity sufficient to cause gyromagnetic resonance absorption at the frequency of operation; i.e., the intensity represented by point A in Fig. 3. An incremental modulating field is provided by coil 44 energized from a modulation generator 48 coupled through a suitable power amplifier 50. As in Fig. 1, the incremental magnetic field necessary to provide amplitude modulation is very small relative to the unidirectional field produced by coil 42, insufficient to cause any significant polarization modulation.

From the foregoing it is seen that applicant has provided apparatus whereby the two oppositely rotating circular components of which a linearly polarized wave may be considered as being made up of may be independently and differently modulated. Ionizable gases and magnetic semi-conductors and specifically ferrites, have been suggested as suitable gyromagnetic media for elements 20 and 22, but it will be understood that other materials exhibiting the characteristics of gyromagnetic resonance absorption may be employed in the system without departing from the spirit of the invention. Also, while two circuit arrangements have been described for producing the necessary magnetic fields in elements 20 and 22, it will be appreciated by one skilled in the art that any number of modulation circuits are available to the art which may be readily modified and adapted to use in the present system. In view of the fact, therefore, that numerous modifications and departures may now be made by those skilled in the art, the invention here is to be construed as limited only by the spirit and scope of the appended claims.

What is claimed is:

1. Modulation apparatus comprising, a section of wave guide having input and output terminals and adapted to propagate circularly polarized electromagnetic wave energy, first and second elements including gyromagnetic media serially disposed within said wave guide section on the longitudinal axis thereof, means for applying linearly polarized wave energy of a predetermined frequency to said input terminals, separate means for producing biasing unidirectional magnetic fields of opposite magnetic polarity in said elements of an intensity to cause the gyromagnetic resonant frequency of said gyromagnetic media to be substantially equal to said predetermined frequency, and separate means for modulating the intensity of the magnetic fields in said elements about said biasing fields whereby the counter-rotating circular components of which said linearly polarized wave energy is constituted may be individually amplitude modulated.

2. Modulation apparatus comprising, a section of wave guide having input and output terminals and adapted to propagate circularly polarized electromagnetic wave energy, means for applying linearly polarized wave energy to said input terminals, first and second elements including gyromagnetic media disposed on the longitudinal axis of said wave guide and spaced apart in the direction of propagation of wave energy therein, first and second means for producing unidirectional magnetic fields in said elements parallel and anti-parallel to the direction of propagation, respectively, of intensities to cause the gyromagnetic resonant frequency of the gyromagnetic media of said elements to be substantially equal to said predetermined frequency, and first and second means for independently varying the intensity of the magnetic fields in said first and second elements in accordance with a signal whereby the counter-rotating circular components of which said linearly polarized wave energy is constituted may be individually amplitude modulated.

3. Apparatus for deriving two intelligence channels from a linearly polarized electromagnetic carrier signal comprising, a section of pipe wave guide adapted to propagate circularly polarized electromagnetic waves, means for applying a linearly polarized carrier signal of predetermined frequency to one end of said wave guide section, first and second elements including a gyromagnetic media positioned within said wave guide on the longitudinal axis thereof and spaced apart in the direction of wave propagation therein, first and second means coupled to said wave guide for respectively producing in said first and second elements unidirectional magnetic fields of opposite magnetic polarities having intensities to cause the gyromagnetic resonance frequency of said gyromagnetic media to be substantially equal to said predetermined frequency, and means for producing in each of said elements an incremental magnetic field each modulated in accordance with a signal whereby the counter-rotating circular components of which said linearly polarized wave energy is constituted may be individually and independently amplitude modulated.

4. Apparatus in accordance with claim 3 wherein said gyromagnetic media is a magnetic semi-conductor.

5. Apparatus in accordance with claim 3 wherein said gyromagnetic media is a magnetic ferrite.

6. Apparatus in accordance with claim 3 wherein said gyromagnetic media is an ionized gas.

7. Apparatus for deriving two intelligence channels from a linearly polarized electromagnetic carrier signal comprising, a section of pipe wave guide adapted to propagate circularly polarized electromagnetic waves, means for applying a linearly polarized carrier signal consisting of counter-rotating circular components having a predetermined frequency of rotation to one end of said wave guide section, first and second elements including a gyromagnetic media disposed within said wave guide section on the longitudinal axis thereof and spaced apart in the direction of wave propagation therein, first and second means coupled to said wave guide arranged respectively to produce in said first and second elements unidirectional fields parallel and anti-parallel to the direction of propagation of intensities to cause the gyromagnetic resonance frequency of said gyromagnetic media to be substantially equal to said predetermined frequency, and means for producing in each of said elements an incremental magnetic field of relatively low intensity each modulated in accordance with a signal to cause amplitude modulation of each of the circular components of the said linearly polarized carrier signal independently of the other.

8. Apparatus adapted to derive two independent intelligence channels from a linearly polarized electromagnetic carrier signal of predetermined frequency comprising, a section of pipe wave guide adapted to propagate circularly polarized electromagnetic waves, means for applying a linearly polarized carrier signal consisting of counter-rotating circular components, each having the same predetermined frequency of rotation, to one end of said wave guide section, first and second magnetic semi-conductor elements having gyromagnetic properties disposed within said wave guide section on the longitudinal axis thereof and spaced apart in the direction of wave propagation therein, first and second separate means coupled to said wave guide arranged respectively to produce biasing unidirectional magnetic fields in said first and second elements parallel and anti-parallel to the direction of propagation each of an intensity to cause the gyromagnetic resonance frequency of each of said elements to be substantially equal to said predetermined frequency, said first element when at resonance being effective to attenuate one circular component of said wave and to pass the counter-rotating component with little or no attenuation, and said second element when at resonance being effective to attenuate the said counter-rotating component and to pass the said one circular component with little or no attenuation, and separate means for producing in each of said first and second elements an incremental magnetic field of relatively low intensity each modulated in accordance with a signal independent of the other to alter the degree of attenuation by each of said elements in accordance with its respective signal thereby to cause amplitude modulation of each of the circular components of said linearly polarized carrier signal independently of the other with substantially no polarization modulation of the linearly polarized carrier signal.

References Cited in the file of this patent

UNITED STATES PATENTS

| | | |
|---|---|---|
| 2,645,758 | Van de Lindt | July 14, 1953 |
| 2,748,353 | Hogan | May 29, 1956 |
| 2,773,245 | Goldstein et al. | Dec. 4, 1956 |